United States Patent [19]

Erickson et al.

[11] Patent Number: 5,402,732
[45] Date of Patent: Apr. 4, 1995

[54] RAILROAD CAR CONVERSION APPARATUS HAVING ADJUSTABLE FRAMEWORK FOR SUPPORTING MATERIAL RECEIVING BLADDERS

[75] Inventors: Stewart E. Erickson, Ketchum, Id.; Ron Randolph, Camden, Ark.; W. David Alldredge, Jr., Aurora, Colo.

[73] Assignee: SEEC, Inc., Mendota Heights, Minn.

[21] Appl. No.: 236,705

[22] Filed: May 2, 1994

Related U.S. Application Data

[63] Continuation of Ser. No. 910,900, Jul. 8, 1992, abandoned.

[51] Int. Cl.$^6$ .......................... B61D 5/00; B61D 7/00
[52] U.S. Cl. ..................................... 105/359; 410/54; 414/498; 414/391; 222/105
[58] Field of Search ................ 105/243, 358, 359, 377; 410/54; 414/498, 679, 347, 399, 391; 222/105, 181; 299/85, 86.4

[56] References Cited

U.S. PATENT DOCUMENTS

| | | | |
|---|---|---|---|
| 2,712,797 | 7/1955 | Woehrle et al. | 296/39.1 |
| 2,875,562 | 3/1959 | Mitchell | 53/434 |
| 2,931,523 | 4/1960 | Nelligan | 414/539 |
| 3,806,185 | 4/1974 | Brandjord | 296/98 |
| 3,831,792 | 8/1974 | Waterman et al. | 105/377 X |
| 4,013,018 | 3/1977 | Hansen et al. | 105/468 |
| 4,461,402 | 7/1984 | Fell et al. | 222/105 |
| 4,470,749 | 9/1984 | Koudstaal | 414/539 |
| 4,497,259 | 2/1985 | Titterton | 105/359 |
| 4,541,765 | 9/1985 | Moore | 414/267 |
| 4,557,400 | 12/1985 | Clarke | 222/102 |
| 4,613,053 | 9/1986 | Kimura et al. | 220/22 |
| 4,678,389 | 7/1987 | Bonerb | 414/267 |
| 4,735,457 | 4/1988 | Bonerb et al. | 298/27 |
| 4,823,708 | 4/1989 | Wymer et al. | 105/377 |
| 4,909,156 | 3/1990 | Erickson | 105/359 |
| 4,946,214 | 8/1990 | Neumann et al. | 105/243 X |
| 5,054,402 | 10/1991 | Brassell | 105/377 |

FOREIGN PATENT DOCUMENTS 563157 12/1957 Belgium .
585205 11/1958 Italy ....................... 105/359

OTHER PUBLICATIONS

Brochure of Amfuel Fuel Cell and Coated Fabrics Company entitled "Fabribin ® Cuts Costs on Shipping-/Handling/Storage!" (1991).
Brochure of Uniroyal, "Sealdtank ®".

Primary Examiner—Robert J. Oberleitner
Assistant Examiner—S. Joseph Morano
Attorney, Agent, or Firm—Fredrikson & Byron

[57] ABSTRACT

A railroad car conversion apparatus for hauling a flowable material in an open-topped railroad car having a frame for holding a plurality of bladders, which may depend downwardly from the frame into the railroad car. The frame is adapted to fit on top of the sidewalls of a hopper car, and be readily attached or detached from the railcar. A plurality of bladders, which may be attached directly to this frame for removal therewith, are also attached in such a manner that they may be readily filled with or emptied of a fluid of a particulate, flowable material without requiring the removal of the frame. The conversion apparatus includes an elongate central beam having first and second ends, and a plurality of bladder-connecting devices for releasably attaching a plurality of material-receiving bladders to the central beam. A plurality of arms may extend generally laterally outwardly from the central beam, such that the arms and central beam are sized to permit each of the arms to abut an upper edge of a side wall of the railroad car. The arms carry a lock for releasably attaching the arms and the central beam to the railroad car, and the central beam carries a grappling device adapted to be engaged by a train mechanism for lifting the central beam and any bladders attached thereto generally upwardly away from the railroad car.

20 Claims, 12 Drawing Sheets

000# RAILROAD CAR CONVERSION APPARATUS HAVING ADJUSTABLE FRAMEWORK FOR SUPPORTING MATERIAL RECEIVING BLADDERS

This application is a continuation of application Ser. No. 07/910,900, filed on Jul. 8, 1992, now abandoned.

FIELD OF THE INVENTION

The present invention generally relates to a means and method for transporting cargo, and particularly relates to a means and method for utilizing open-topped railroad cars for transporting flowable materials.

BACKGROUND OF THE INVENTION

The structure and design of railroad cars typically depend upon the nature of the material being hauled with the cars. Fluids, such as fossil fuels or other liquid chemicals, are typically carried in entirely enclosed liquid tanker cars. Tanker cars include closable openings through which they may be filled. These openings are positioned on the top and are capped to protect the contents of the tanker. The tanker cars also generally include ports carried on their lower side to empty the tankers of the liquid by the force of gravity.

Particulate or granular commodities, such as coal or mineral ores or the like, are generally transported by rail in open-topped railcars. Such open-topped railcars generally have a number of vertical walls extending upwardly from a floor to define a cavity. A number of cross braces frequently extend from a position along a vertical wall downwardly and inwardly to the floor or generally horizontally from one sidewall to another, providing structural support and rigidity to the railroad car. When loading such open-topped railcars, the cars are generally positioned beneath a large hopper and the cargo is loaded through the upper open top of the car; such loading is often referred to as "flood loading". When the railroad car reaches its destination, the cargo may be unloaded through the openings carried in the floor of the car, which may be in the form of a plurality of conical or "V"-shaped depressions that converge downwardly into a flow-control door system carried by the lower portion of the car.

Alternatively, some open-topped cars, referred to as "roll over" or "rotary dumping" cars, may unload product by being pivoted about a central axis to invert the car, thereby emptying its contents through its open top. Such rotary dumping cars may not be adapted to release product through the floor, but do generally include cross braces for support.

Both tanker cars and hopper cars are specifically suited for their intended purposes—tanker cars generally cannot be used for hauling anything but fluids and hopper cars generally cannot be used for hauling anything but granular commodities. As a result, railroad cars frequently carry loads in only one direction, under-utilizing their railcars by making a return trip without any cargo. For example, coal cars carry coal from coal mines to a purchaser, but return back to the coal mine empty. Such "deadheading" results in relatively high operating expenses for the railroad (including fuel for transporting empty cars) and high capital costs (for single purpose, dedicated railroad cars which remain empty half of the time).

A number of attempts have been made to convert certain types of vehicles, such as semi-trailers or vans, from a configuration suitable for handling piece goods to configurations for handling bulk materials. For instance, U.S. Pat. No. 4,735,457 (Bonerb et al) and U.S. Pat. No. 4,678,389 (Bonerb) disclose a system for converting a trailer for use with a truck from a piece-good configuration to a bulk material configuration. This design utilizes a plurality of cup-shaped, upwardly open bags attached to a system of pulleys and cables. The pulleys and cables are permanently fixed to and become a part of the structure of the trailer. These pulleys and cables are used to lower these open-topped containers wherein they may be used to haul bulk goods such as grains and to raise and collapse the containers into a compact position disposed against the roof of the trailer. The pulleys and cables include struts which extend from the floor to the roof and are permanently affixed to the floor and the roof to provide both structural integrity and to guide the deployment of the containers as they are raised and lowered with the cables.

U.S. Pat. No. 4,497,259 (Titterton) discloses a flatbed railcar which includes a specially-designed floor. The floor of this car includes a brace which is positioned at the bottom of the car to define its floor when in use as a flatbed. However, this brace may be raised upwardly along guides on the bulkheads of the car to lift a series of flexible containers. This brace includes a series of openings which communicate with the interiors of the containers and a series of discharge ports are carried on the underside of the railcar, with one discharge port being associated with each container. Once the flexible containers have been emptied of their contents through the discharge ports, the brace may be lowered once again, collapsing the containers, such that the brace once again serves as the floor of the flatbed car.

U.S. Pat. No. 4,909,156 (Erickson), issued to one of the inventors of the present invention, discloses a large, flexible bladder for use with open-topped railcars. This bladder is designed to line most or all of the interior of the railcar and includes a filling port positioned at the top of the car and a discharge port positioned adjacent the flow-control valve system carried on the underside of the car. When the railcar is being used to haul materials such as coal, the bladder may be completely collapsed. Although the bladder may be simply carried outside of the railcar, it is also designed to serve as a tarp which covers the material within the railcar. The tarp must be lashed down to the top of the railroad car by a series of cables or the like in order to prevent it from blowing away as the train progresses.

When it is desired to convert the railcar from a configuration for hauling bulk materials such as coal to a liquid-hauling configuration, the bladder may be positioned within the railcar and filled with a liquid or other flowable material. Upon reaching the desired destination, the bag may be emptied through the discharge ports on its underside and the bladder may be rolled up and out of the way so that the car may be filled with granular materials through the car's open top from a silo, as described above.

Thus, attempts have been made to convert a trailer or the like adapted for use with one type of commodity to a configuration suitable for hauling another type of commodity. However, each of the attempts described above have a number of deficiencies.

In the design proposed by Bonerb and Bonerb et al., a rather complex series of pulleys, cables and struts must be used. Since this structure must be permanently affixed to the trailer and relies upon the presence of both a roof and floor of the trailer, such a permanent structure would not be useful for railroad hopper cars or the like which must commonly be filled through an open top and, in the case of rotary dumping cars, must be emptied through the open top as well. Furthermore, adding all of this complex structure to a trailer is rather time consuming and quite expensive, greatly increasing the cost of each individual trailer outfitted with this conversion equipment. Unless a trailer is dedicated to a single route wherein piece goods would be hauled in one direction and bulk materials would be hauled in the other, the cost of adding this conversion may well outweigh the possible benefit of the added capability of hauling grains and the like.

Titterton's flatbed car suffers from many of the same problems associated with Bonerb's design. In particular, the structure of this flatbed car requires that the flexible containers and the supporting brace be a permanent part of the flatbed car. Additionally, a number of cables and pulleys must be utilized to permit the brace/false floor to be raised and lowered between its flatbed configuration and its bulk cargo configuration. The very structure of this flatbed car dictates that the floor of the flatbed must be movable, that a series of ports be provided in this false floor for filling the flexible containers, and that the bottom of the railcar be provided with discharge hoppers. Since standard flatbed cars do not include all of this structure, Titterton's railcar must initially be built according to his invention, i.e., an existing flatbed railcar cannot readily be retrofitted with this invention. As in Bonerb's invention, this requires that the railcar be dedicated to a route that would justify the additional expense of the movable floor and the flexible containers.

Additionally, most open-topped railcars of the type discussed above include cross braces for structural support and rigidity. The presence of such cross braces would prevent one from using a false floor that must be raised and lowered as required by Titterton because the floor's movement would be blocked by the braces.

Erickson's design is adapted to readily retrofit existing open-topped railcars without any significant additional expense. At the most, providing a series of hooks of the like for retention of attachment cables about the periphery of the car and a small bar or the like for retraction of the bladder are all that are required. However, as noted above, a number of open-topped car designs utilize cross braces which may extend into the interior cavity of the car.

When hauling bulk materials such as coal, such braces are not a serious impediment because the coal will simply surround the braces during filling. Cars utilizing such cross braces for structural support essentially preclude the use of a bladder such as that set forth by Erickson, though, without specially constructing an expensive convoluted bag dedicated to use with a single railcar design. Even if one were to specially design such a bladder, the stress concentration on the bladders about these braces and any convolutions in the floor can cause undue wear and reduce the life of the bladder.

Many trains using open-topped cars, such as unit trains used in hauling coal, move continuously, even during filling and emptying of the railcars. For instance, when such cars are unloaded, they are generally indexed forward one car length at a time to properly position a car over the unloading location. Any reduction in the rate at which the trains move through the filling and emptying stations leads to unacceptable disruption or delay of the normal loading and unloading process of the train. The bladder design proposed by Erickson is fairly cumbersome to handle due to its rather large size and must be physically lashed down to the rail cars when used as a tarp, as explained above. This handling difficulty and the process of tying the tarp down can significantly delay a train during the loading and unloading operations.

Thus, it would be desirable to provide a relatively inexpensive mechanism for converting any standard open-topped railcar to a configuration for use in hauling liquids or other flowable materials. In particular, such a design would require that the bladder or bladders be removable from the cargo hold of the railcar so that the car may be filled, and possibly emptied, with existing equipment through an open top, desirably without any significant reduction in the rate of progress of the train. It may also be desirable to provide a cover for such a railcar to minimize the loss of coal or the like as a train proceeds down the track.

SUMMARY OF THE INVENTION

The present invention provides a frame for holding a plurality of bladders, which may depend downwardly from the frame. The frame is adapted to fit on the top of the sidewalls of a railcar and be readily attached or detached from the railcar. A plurality of bladders may be attached directly to this frame for removal therewith. The bladders desirably are attached to the frame in such a manner that they may be readily filled with or emptied of a fluid or a particulate, flowable material without requiring the removal of the frame.

Additionally, the bladders may be provided with an upstanding grappling member which extends upwardly above the frame. When the railcar has reached the desired destination with a plurality of filled bladders, a removal mechanism, such as a crane, may be attached to these grappling members. The crane may then be used to lift the frame and filled bladders out of the railcar, permitting it to be filled through its upper opening with coal or the like. If so desired, the frame may be provided with a tarpaulin or other cover extending about the frame so that it may serve to cover the top of the car when the frame is attached to the car.

The present invention also contemplates a bladder removal station for removing bladders from the cargo cavity of a railcar. This removal station includes a movable crane mechanism carried overhead and positioned immediately adjacent and above a length of railroad track. Railcars having bladders and a frame of the invention travel along the track and are presented at the removal station. The crane mechanism grasps upstanding grappling members attached to the frame to lift the frame and bladders upwardly away from the car and deposit the bladders at an emptying location.

The crane mechanism is desirably adapted to lift a frame and its associated bladders as a unit from a moving or indexing railcar and deposit the frame and bladders at a drop-off location. The bladders may then be emptied at any convenient time without delaying the forward progress of the train, i.e. the train may continue to undergo its standard loading or unloading procedure.

DETAILED DESCRIPTION OF THE INVENTION

FIGS. 1-14 depict various embodiments of a frame in accordance with the present invention. Turning first to FIGS. 1-4, a frame 10 generally comprises a central beam 20 and a plurality of arms 30 carried by opposite ends of the central beam. The central beam may be of any desired construction, but should be relatively stiff and structurally strong in order to support the bladders depending therefrom within a railcar, as described below.

Figure 16B:
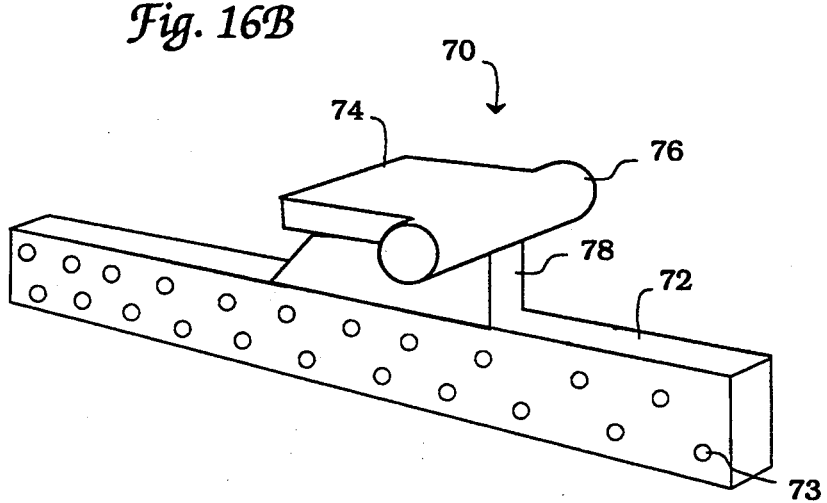
FIG. 16B is a perspective view of the grappling mechanism of FIG. 16A.
Figure 16A:
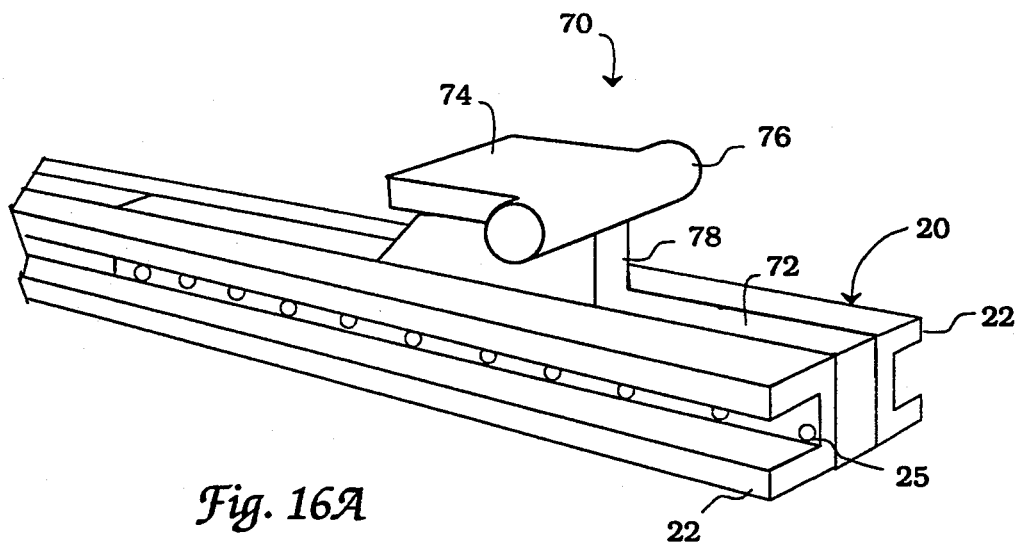
FIG. 16A is a broken-away perspective isolation view of a portion of a frame and a grappling mechanism of the invention.

In one preferred embodiment, the central beam 20 is elongate in shape and consists of a pair of elongate, generally C-shaped brackets 22 (best seen in FIG. 16A), which may be formed of steel. The two brackets 22 extend generally parallel to one another and, for reasons described more fully below, are desirably spaced apart from one another. The C-shaped brackets 22 in this embodiment are oriented such that they are open in a direction facing laterally away from the other paired C-shaped bracket, as shown in FIG. 16A.

Figure 15:
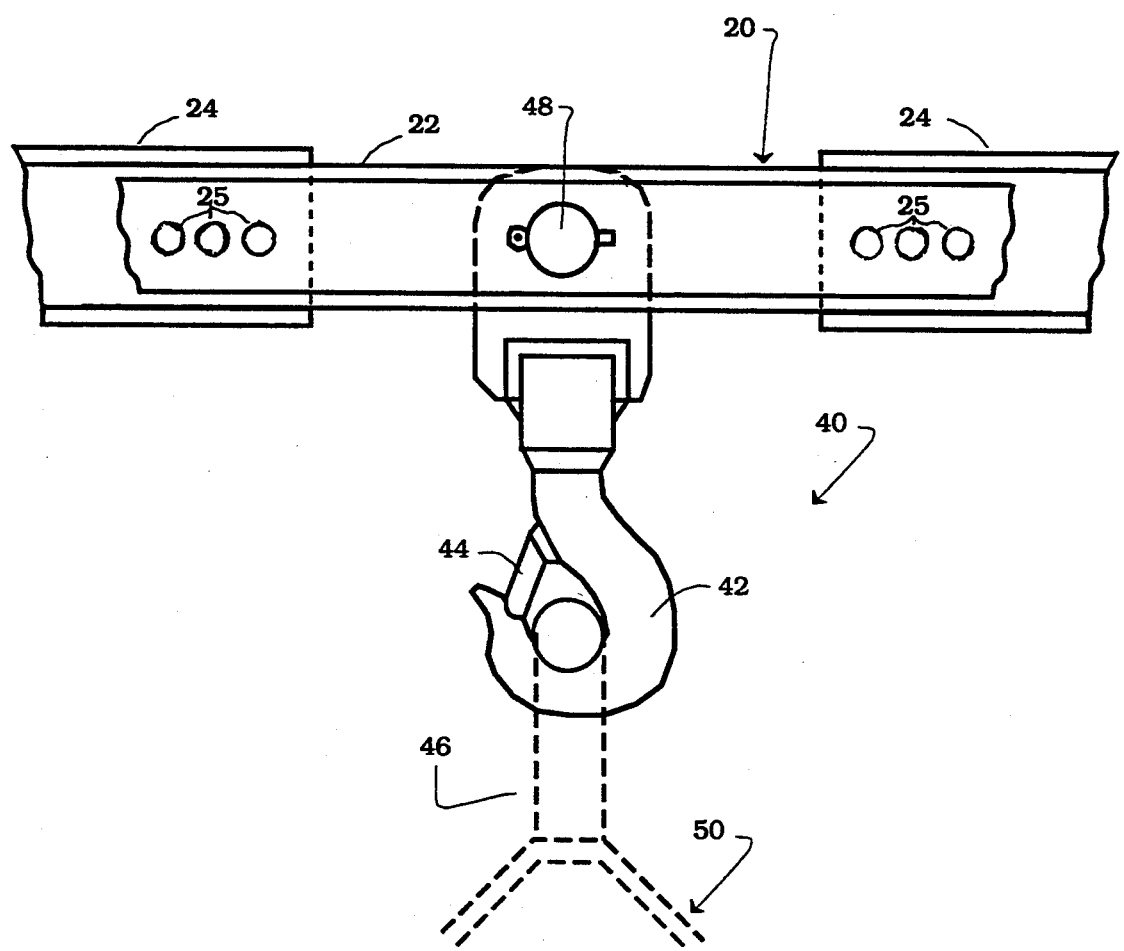
FIG. 15 is a side view of a bladder suspension mechanism for use in a frame of the invention.

It is to be understood that this configuration is not the only suitable configuration of the central beam. For instance, most or all of the length of the beam 20 may comprise an I-beam to increase stiffness of the beam. If it is necessary to provide recesses in the beam, such as in the embodiments of the bladder connectors 40 and grappling members 70 described below, C-shaped brackets 22 may be carried within the channels of the I-beam and a length of the I-beam may be omitted at this juncture. Such a configuration is shown in FIG. 15.

As shown in that drawing, this will provide a pair of spaced-apart C-shaped brackets 22 oriented substantially as set forth above at these connection sites so that the connectors 40 and grappling members 70 may be attached as described below without significantly sacrificing strength or rigidity of the I-beam configuration. In order to enhance the rigidity of the beam 20, it is preferred that the brackets 22 extend along a length of the I-beam 24 on either side of the connector 40 within the recess on the side of the I-beam; if desired, the brackets may extend along the entire length of the central beam.

The bracket may be attached to the I-beam in any suitable manner, such as by welding. It is preferred, though, that bolts 25 or some other suitable releasable attachment be used. This will permit the bracket to be moved with respect to the I-beams to which it is attached, thereby altering the overall length of the central beam. This permits the length of the beam 20, and therefore the length of the frame 10, to be adjusted as necessary to accommodate any variations in the lengths of different railcar designs. Once the beam 20 is extended or retracted to the desired length, the brackets 22 may be reattached to the I-beam for use. Although FIG. 15 only illustrates this feature with respect to the bladder connectors 40, it is to be understood that such an arrangement may be used at any desired point along the length of the central beam, such as adjacent the grappling members 70 described below.

One or more arms 30 may be attached to the central beam at each end 24 thereof. If so desired, a single arm may extend generally laterally of the central beam at each end. In a preferred embodiment, though, two arms are provided at each end of the beam 20, as shown. These arms may be attached to the central beam in any suitably strong manner, such as by welding or by means of bolts or the like.

As noted above, the arms desirably extend generally laterally outwardly of the central beam. As shown in FIGS. 1-4, however, the arms also extend generally longitudinally and downwardly of the central beam in a direction away from the beam. As explained more fully in connection with FIG. 4, this permits the central beam to be positioned generally above and parallel to the midline of the railcar.

Figure 4:
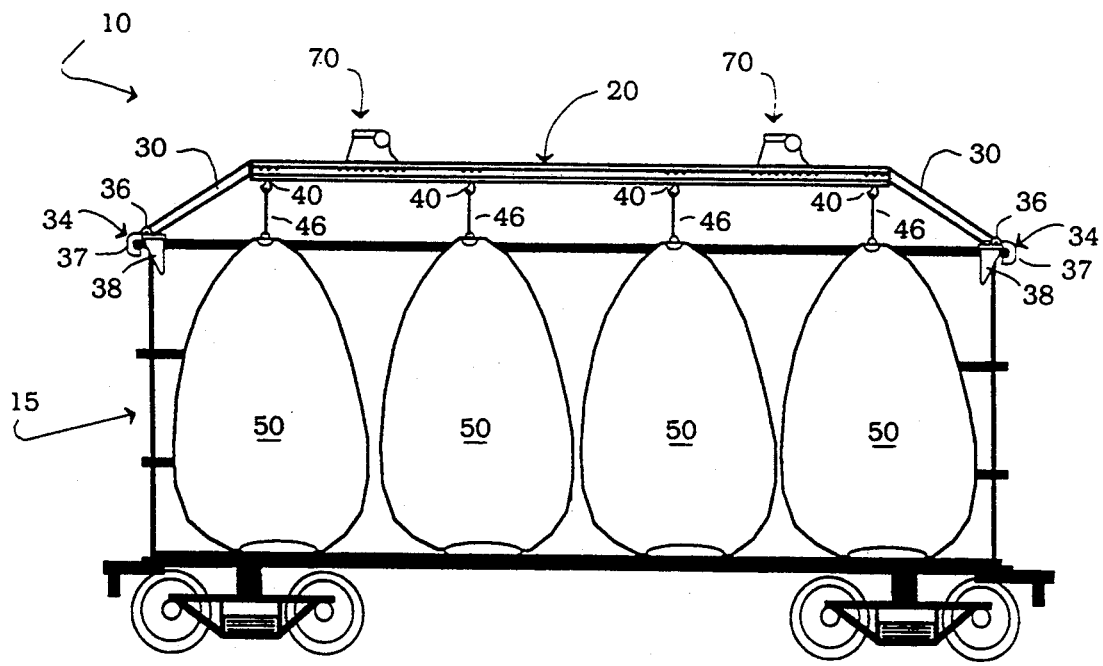
FIG. 4 is a side, cross-sectional view of the frame of FIG. 3 attached to a railroad car.

The central beam and arms of the frame should be sized to permit the ends of each of the arms to abut the top of a sidewall of an open-topped railcar 15, as shown in FIG. 4. Such railcars may have variations in their design, but they tend to be of dimensions standardized throughout the railroad industry. Accordingly, a frame of the invention may be used with a variety of different open-topped railcars, such as both standard and rotary-dumping cars.

The ends of the arms disposed away from the central beam, i.e. the portion of the arms adapted to contact the sidewalls of railcars, are desirably provided with means for releasably attaching the frame 10 to a railcar 15. In the embodiment shown, a locking clamp 34 is provided at the end of each arm 30 of the frame. The clamp 34 is preferably pivotably attached to an arm, such as by means of a pivot pin 36. A lower portion 35 of the clamp may extend downwardly of the end of its associated arm when the frame is not deployed on a railcar, with an upper portion 37 being carried generally above the end of the arm. The upper portion of the clamp is adapted to releasably engage the sidewall of the railcar, such as by fitting around a lip provided on the upper edge of the car's sidewall, as shown in FIG. 4.

Figure 1:
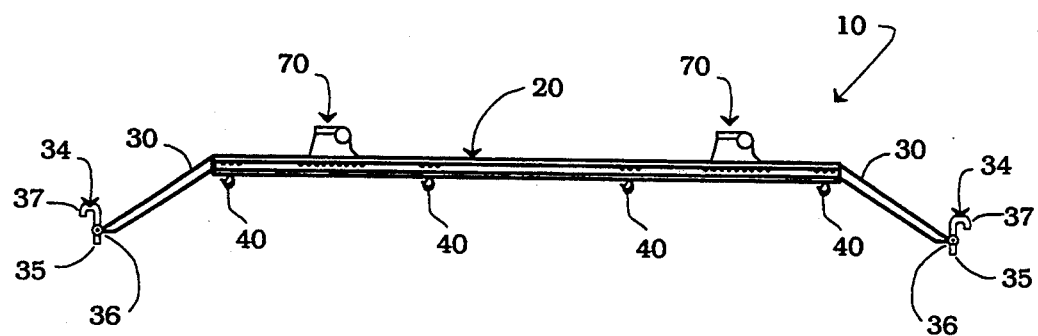
FIG. 1 is a side view of a frame according to a first embodiment of the present invention.
Figure 2:
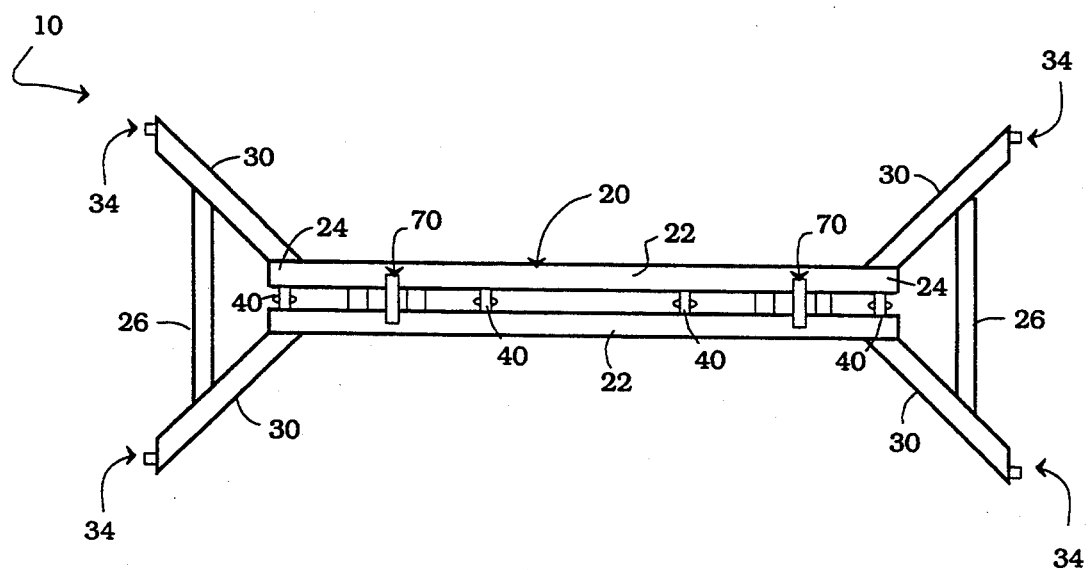
FIG. 2 is a top view of the frame of FIG. 1.
Figure 3:
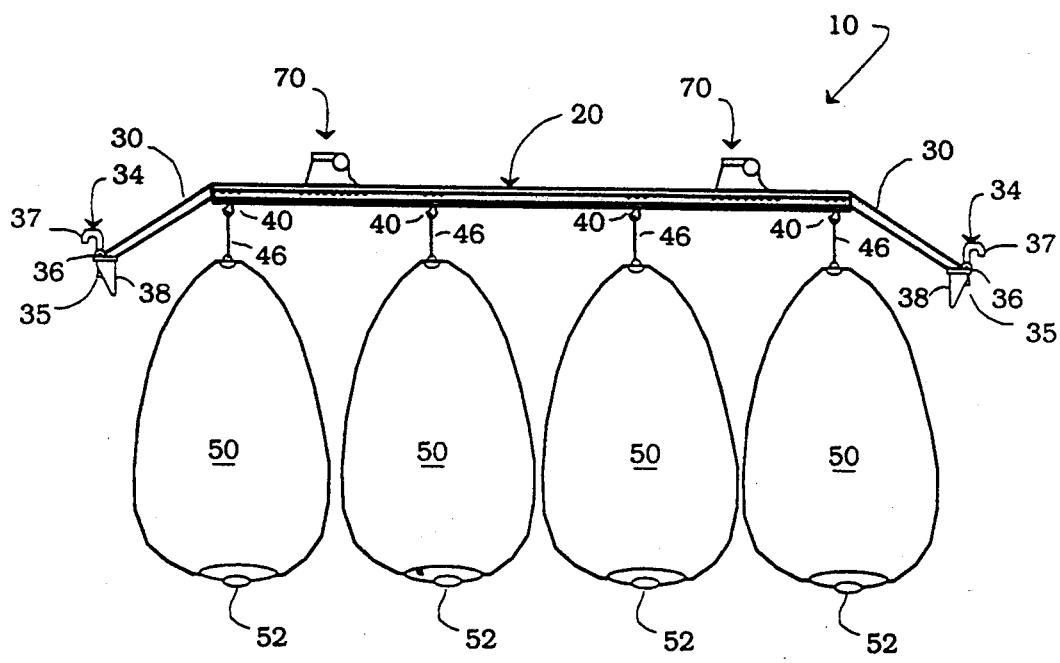
FIG. 3 is a top view of the frame of FIG. 1 having a plurality of bladders suspended therefrom.

The clamp is desirably biased toward the position shown in FIGS. 1-3, such as by means of a spring about the pivot pin 36. When the frame is lowered onto a railcar for attachment thereto, the lower portion 35 of the clamp will abut the top of the car's sidewall. The weight of the frame, including any bladders attached thereto, will act against the bias of the clamp and urge it into the position shown in FIG. 4 so that it may engage the sidewall to attach the frame to the car. When it is desired to remove the frame, one may lift the frame upwardly away from the railcar and the bias of the clamp will urge it into its rest position, shown in FIGS. 1-3.

In one particularly preferred embodiment, shown in the attached drawings, the clamp 34 includes a wedge 38 to assist in properly seating the frame and clamp on a railcar. This wedge 38 is desirably generally angular in shape, with a lower portion being narrower than its upper portion. The narrower portion of the wedge will be inserted into the interior of the railcar first. If the frame is somewhat out of alignment with the railcar, the wedge of one of the clamps will contact the top of the car and urge the frame into proper position for attachment to the car. Thus, each wedge will permit a certain degree of latitude in placing the frame on a railcar—if the clamp is disposed slightly outside the car, the wedge will urge it back into position as the frame is lowered into contact with the car. By using a wedge 38 with each clamp 34, the frame can be securely and accurately attached to the tops of the railcars.

If so desired, cross beams 26 may be attached to the arms in order to provide structural support and rigidity to the frame. In the embodiment of FIGS. 1 and 2, two cross beams are used, with both of the cross beams being oriented generally transversely of the central beam 20. Each cross beam 26 is disposed between two arms attached to the same end of the central beam and serves to rigidly interconnect these two arms. In the embodiment depicted in these figures, the cross beam is spaced away from the end of the central beam 20 and the ends of the arms, desirably being positioned approximately midway along the length of the arms. The cross beams may be rigidly affixed to their respective arms in any desired fashion, such as by welding or the like.

Figure 6:
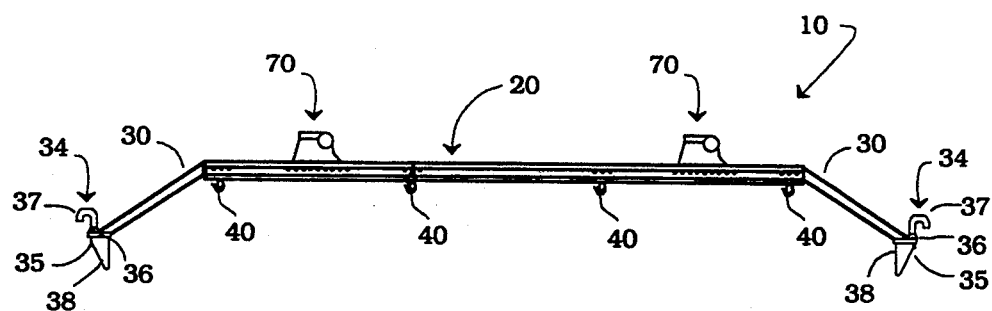
FIG. 6 is a side view of a frame according to a second embodiment of the present invention.
Figure 7:
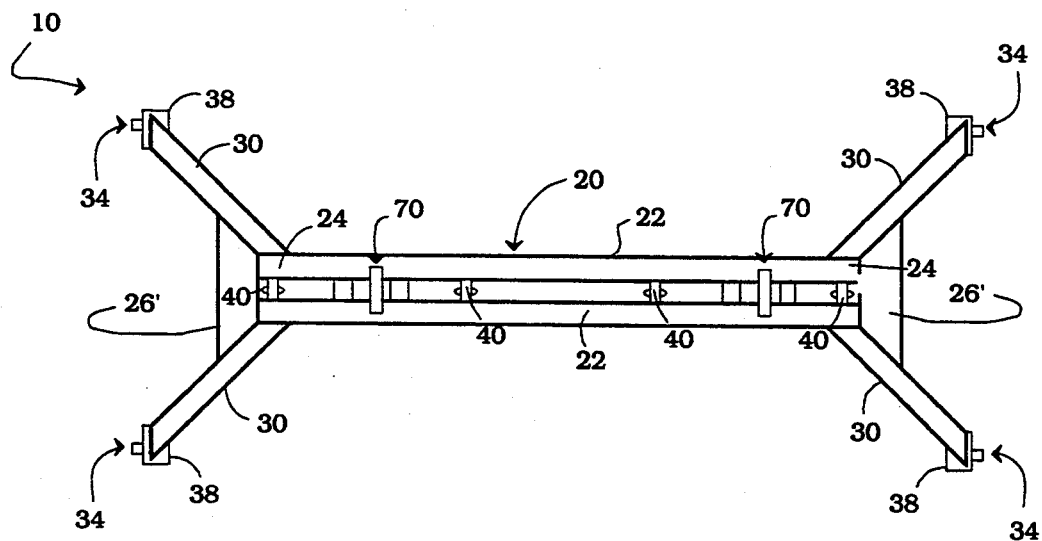
FIG. 7 is a top view of the frame of FIG. 6.

In another alternative embodiment, the cross beam does not comprise an elongate beam (such as the beam shown in FIG. 2), but instead is formed in the shape of a plate 26' as shown in FIGS. 6 and 7. This plate 26' may be formed of a piece of sheet metal or other relatively rigid material and desirably defines a web extending between adjacent arms attached to the same end of the central beam. The plate may extend along and between the entire lengths of the arms, but it is contemplated that this will be unnecessary and that the plate 26' may extend between the attachment of the arms to the central beam 20 and a position about midway along the length of the arms.

Figure 8:
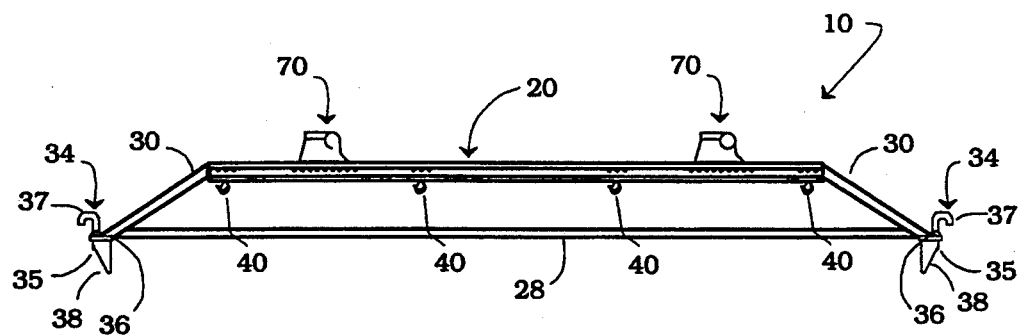
FIG. 8 is a side view of a frame according to a third embodiment of the present invention.
Figure 9:
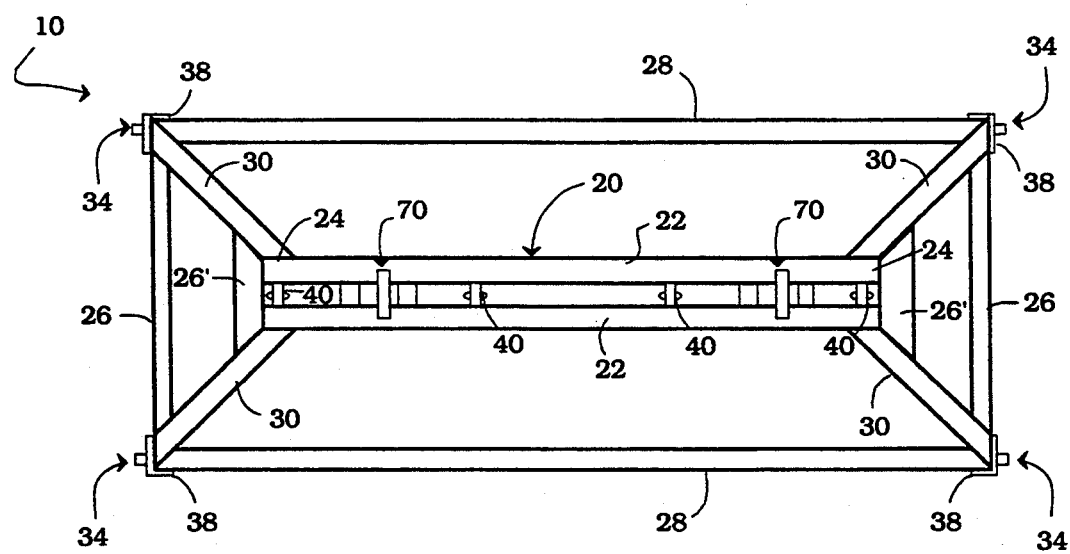
FIG. 9 is a top view of the frame of FIG. 8.

The frame shown in FIGS. 8 and 9 employs cross beams 26 extending between and rigidly interconnecting the arms attached to the same end of the central beam, as in FIGS. 1 and 2. In order to further increase rigidity between these two arms, one may employ a plate 26' as well as the cross beams 26. In the embodiment shown in these drawings, though, the transversely oriented cross beams 26 are connected to the arms adjacent their ends disposed away from the central beam.

The frame 10 of this embodiment also includes a pair of longitudinally extending cross beams 28 which are oriented generally parallel to the central beam. These beams 28 serve to rigidly interconnect two arms attached to different ends of the central beam and may be attached to these arms adjacent their ends disposed away from the central beam.

If so desired, the cross beams 26,28 may be adapted to abut the tops of the sidewalls of a railcar when the frame is deployed on the car, as described above in connection with FIG. 4. This will serve to further seat the frame on top of the car. If so desired, the cross beams 26,28 may be generally L-shaped in cross section (not shown) so that the top of a sidewall of a car may be received within the periphery defined by the downwardly extending legs of the L-shaped beams and the horizontally extending legs of the beams may rest upon the tops of the sidewalls.

As explained above, a frame of the invention is intended to carry a plurality of bladders and position the bladders within a railcar. Accordingly, the frame 10 includes a plurality of bladder connectors 40 for connecting bladders 50 to the frame, as depicted in FIGS. 3 and 4. It is preferred that each of the connectors be adapted to carry a single bladder, but more than one bladder could be connected to each connector if so desired. The bladder connectors 40 are disposed along the length of the frame and they are desirably carried by the central beam 20. When the frame is lowered onto or lifted upwardly from a railcar, as described below, the frame will need to support the weight of the bladders.

As these bladders may weigh more than 20,000 pounds each when filled, the bladder connectors need to be able to bear substantial weight. The connectors are spaced along the length of the central beam to ensure that the weight is evenly distributed along the length of the frame. Although the connectors need not be uniformly spaced along the length of the frame, it is important that they be arranged symmetrically about the center of the frame. If the connectors were asymmetrically spaced along the beam 20, the weight would be unevenly distributed along the frame and this could cause difficulties when raising and lowering the bladders for deployment in and removal from the railcars. Although the connectors 40 are shown in FIGS. 3 and 4, it is to be understood that any desired number of connectors may be used.

As noted above, the bladders 50 can be rather heavy and the bladder connectors need to be able to bear their weight during lifting and lowering of the bladders. One preferred bladder connector construction is shown in FIG. 15. In this embodiment, the connector 40 comprises a hook 42 carried by the central beam 20 of the frame. The hook 42 is adapted to receive a cable 46, which may be formed of braided steel or the like, which is in turn connected to the bladder. A locking pin 44 may be provided on the hook to prevent the cable from being inadvertently released from the hook, but the pin should be movable to permit the cable and its associated bladder to be removed from the hook when desired.

Although the hook may be attached to the frame by any suitable method, it is preferred that the hook remain pivotable with respect to the frame. This will permit the bladders to move with respect to the frame during use, preventing unnecessary stress on the frame. In the embodiment shown in FIG. 15, the hook is connected to the central beam 20 of the frame by means of a rod 48 which is received in ports formed in each of the C- shaped brackets 22 of the beam. The hook is in turn pivotably connected to the rod 48. As best seen in FIG. 2, the hooks are therefore disposed between the two brackets 22 and serve to effectively connect the brackets to one another.

Bladders 50 suitable for use with a frame of the invention are commercially available, such as those sold under the tradename Fabribin by the American Fuel Cell and Coated Fabrics Company. These bladders are available in a variety of sizes, ranging from relatively small capacity vessels to bladders capable of holding upwardly of 20,000 pounds of a flowable commodity. When the bladders are deployed in a railroad car 15, the bladders desirably rest against the bottom of the car (as depicted in FIG. 4) to stabilize the bladders as the train moves along a track and to reduce the weight load on the frame. Suitable means for attaching cables to such bladders are known in the art; any such means capable of handling the anticipated weight of the bladders may be used in the present invention.

As shown in FIG. 3, the bladders may include a port 52 adjacent the bottom thereof for filling and emptying the bladders. Means for filling and emptying such bladders are commercially available and need not be discussed in detail here. However, it is preferred that the emptying apparatus be adapted to empty the bladders by simply holding the bladders aloft and allowing them to empty their flowable contents through this port 52 or, perhaps, to use a gravity assisted method, such as by squeezing the sides of the bladder to urge the contents out of the bladders. For materials that are more viscous or otherwise less flowable, it may be desirable to use a plunger pump or the like to urge the contents out of the bladder under pressure.

It may be desirable to interconnect the ports 52 of the bladders by means of a manifold (not shown) or the like to speed up the filling and emptying processes. For example, this manifold may direct the material flowing out of each of the bladders attached to one frame through a single outlet so that all of the material can be readily directed into a single collection bin or cart. It is expected that in such an arrangement a plunger pump or the like will be very helpful in maintaining an acceptable emptying rate.

It is contemplated that the present invention will be used to convert an open-topped railcar used to haul commodities commonly associated with such cars into a configuration suitable for hauling liquids or other flowable products. Thus, while such a railcar may currently "deadhead" without any cargo along its return trip after delivering its commodity to its destination, the present invention will permit another, substantially different commodity to be hauled on the return trip. For instance, coal is currently hauled in open-topped railcars from a coal mine to a delivery site such as a coal-fired power facility, but the train does not pick up a commodity at the power facility to haul back to the coal mine. By deploying the present invention in the cars of the train, the train may haul materials it was not adapted to haul in its standard open-topped configuration.

Two possible materials to haul on the return trip are "fly ash", the residue left after burning coal, and "sludge", a fluid left after standard aeration of sewage. One could, for instance, use the fly ash in mine reclamation by mixing it with slag already present at the mine site—the generally basic ash can offset the acidity of the slag to produce a more environmentally neutral material. The sludge tends to be relatively rich in nutrients and, with further treatment, may be used as a fertilizer or the like in mine reclamation projects. Fly ash is too fine to be hauled in open-topped cars and sludge presents significant handling problems in open-topped cars, including cleaning and the lack of even minimal containment of the waste during an accident. The present invention, therefore, permits the train to backhaul loads that it would ordinarily be unable to carry.

It is contemplated that a train used with the present invention will make a series of round trips to the same destination and back. If one were to remove the filled bladders at one end of the trip but not return the bladders to the other end, one would need to continually purchase more bladders to use at that end. It is therefore desirable to haul the bladders back to the other end of the trip even if they are not filled with a commodity.

Figure 5:
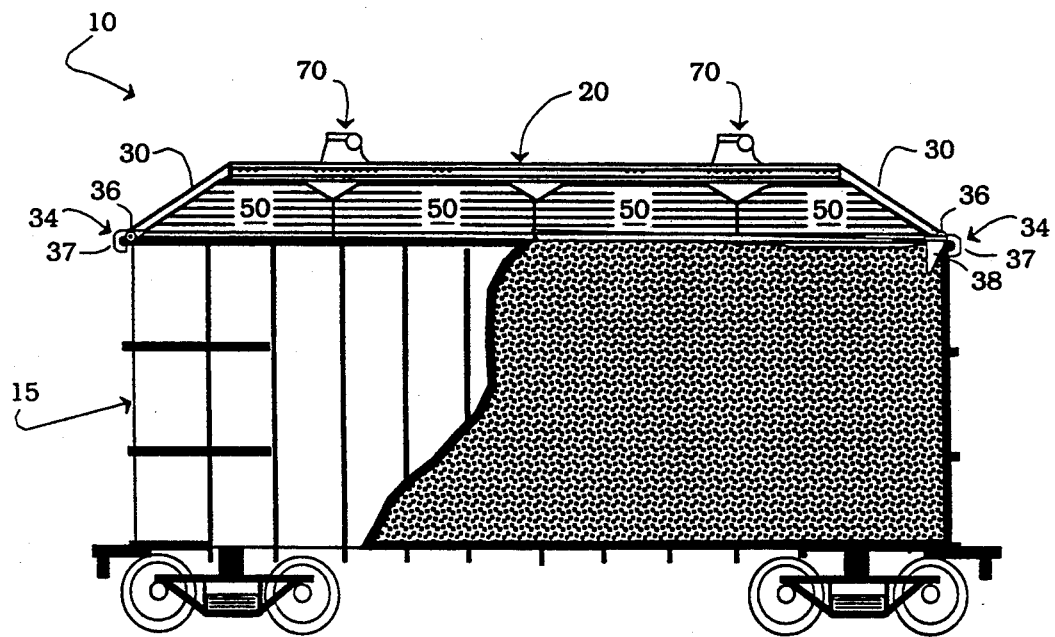
FIG. 5 is a side view of the frame of FIG. 3 wherein the bladders are collapsed for use as tarpaulins.

A particularly useful manner of hauling the bladders on this outbound trip is depicted schematically in FIG. 5. The bladders 50 will be readily collapsed into a relatively flat, compact configuration that can be received generally within the confines of the frame 10. The bladders may be rested upon the top of the contents of the railcar, such as the coal C shown in FIG. 5. This permits the bladders to serve as a tarp over the contents of the railcar, minimizing any loss of product as the train moves along the track. When the train reaches the destination for the commodity, such as the coal-fired power plant noted above, the frame and the empty bladders may be lifted off of the railcar so that the commodity may be delivered in its standard manner.

The bladders may then be filled with any suitable commodity, such as flyash, for the return trip. Although the bladders may be filled after reaching the destination and be immediately placed within the railcars for the return trip, this may be too time consuming; in such instances, it is desirable that a series of bladders already be filled when the train arrives so that the time necessary to fill the bladders is eliminated. The bladders removed upon arrival of the train may be kept at the destination for filling with the desired commodity and be carried back on the next return trip or the next train. Empty bladders on a frame may be replaced with filled bladders by removing the cables 46 from the hooks 42 or, alternatively, a second set of frames may be retained at the delivery site so that a frame of filled bladders is waiting for arrival of the train, further reducing the turn-around time at the delivery site.

Figure 10:
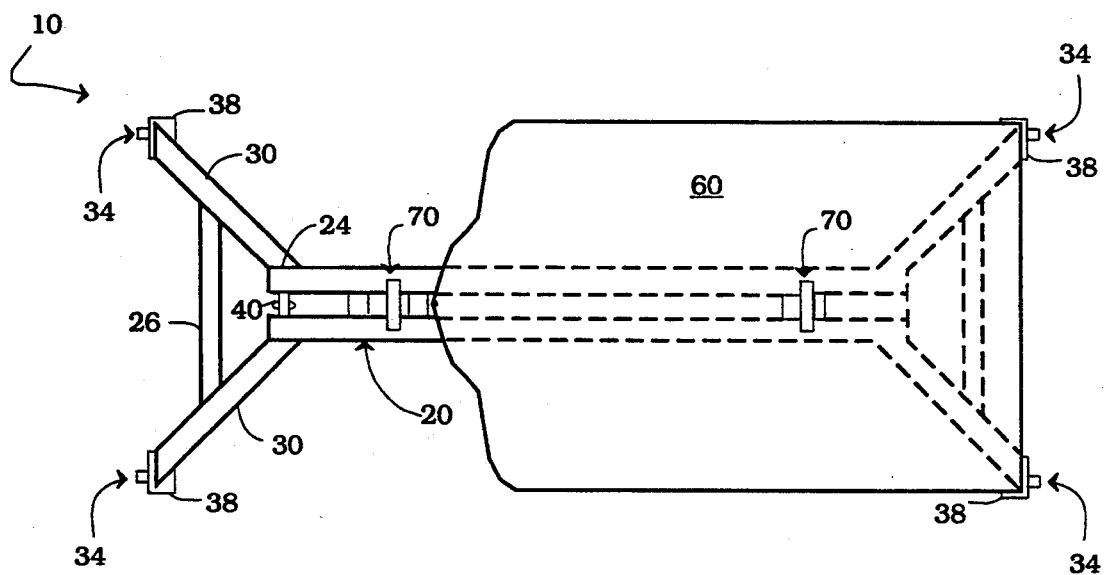
FIG. 10 is a top, partially broken-away view of a frame of the invention utilizing a cover.

FIG. 10 depicts an alternative embodiment of the frame 10 of FIG. 1. Although most of the structural elements of the these frames are essentially the same, the frame of FIG. 10 also includes a tarpaulin 60. This tarpaulin is adapted to serve as a cover over the interior of a railcar when the frame 10 is attached to the top of the car. It is preferred that the tarpaulin cover substantially the entire frame so that it will provide an effective cover for the railcar.

In the embodiment shown, the tarpaulin 60 extends between the outer ends of each of the arms 30 of the frame and over the central beam 20. It is contemplated that the present frame will be placed onto and lifted off of the railcar using upstanding grappling members 70 provided along the central beam, as explained in detail below. To permit the lifting mechanism to securely grasp these grappling members, the grappling members 70 should extend upwardly beyond and through the tarpaulin, as shown. This may be accomplished by simply providing a port (not shown) through the tarpaulin adapted for passage of the grappling members therethrough. If desired, the tarpaulin may be detachable from the rest of the frame 10 so that it may be deployed when needed but removed when it is not necessary.

The tarpaulin may be formed of any suitable material, such as a strong canvas fabric or the like. It is desirable that the material be relatively flexible so that it may be collapsed for storage or transport when the tarpaulin is removed from the frame. One other material which may meet these qualifications is a fabric coated with a liquid-impermeable rubber or plastic material, such as the fabric used in the manufacture of the Fabribin bladders noted above.

Figure 13:
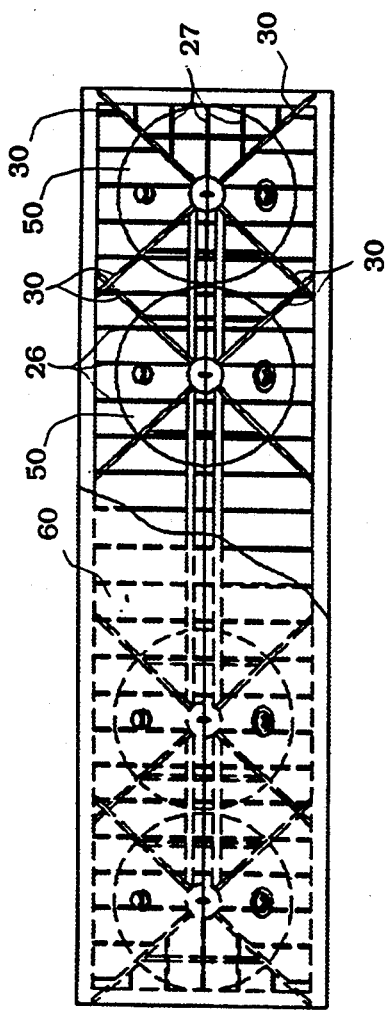
FIG. 13 is a top, partially broken-away view of a frame of another embodiment of the invention attached to a railroad ear.
Figure 14:
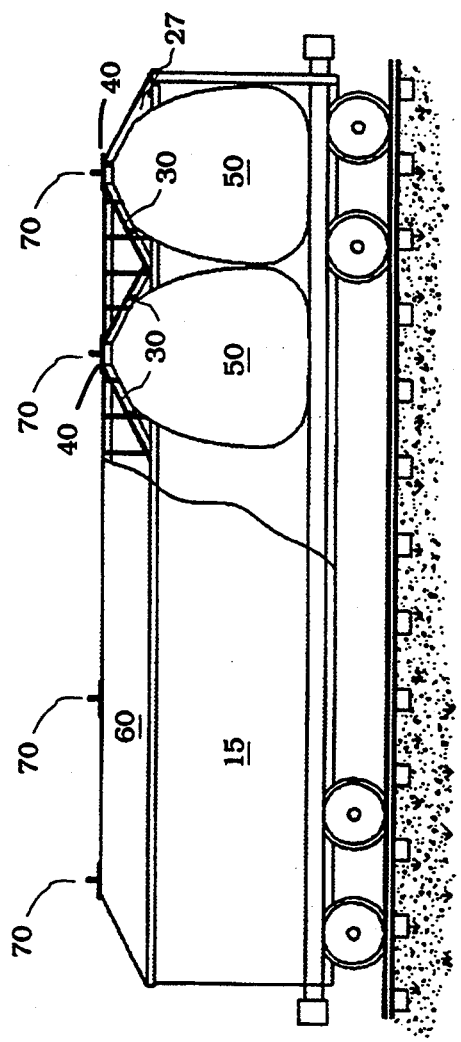
FIG. 14 is a side, partially broken-away view of the frame and railroad car of FIG. 13.

FIGS. 13 and 14 depict another embodiment of the present invention which uses a cover so that it may serve as a cover for a railcar. However, unlike the previous embodiment, the cover 60 includes a number of structural supports not used in the embodiment of FIG. 10.

The frame 10 shown in FIGS. 13 and 14 includes a plurality of arms 30 which extend from the central beam. Whereas the previous embodiments only employ two arms at each end of the central beam, the present embodiment includes four arms associated with each bladder connector 40. Each of these arms extend generally downwardly away from the connector 40 and are oriented at about a 45 degree angle from the central beam as viewed from above (i.e. as shown in FIG. 13).

The positioning of these sets of arms about each bladder connector 40 defines a generally pyramidical recess associated with each connector. When the bladders are filled, this recess does not generally play a major role in the positioning of the bladder attached to the connector 40. When the bladders are emptied, though, they may be collapsed, as discussed above in connection with FIG. 5. The arms 30 of the present embodiment are desirably oriented to define a recess sized to receive a collapsed bladder. When the bladders are placed on top of cargo within the railcar, as shown for a previous embodiment in FIG. 5, the bladders will be collapsed within the recesses and their bottoms will rest on top of the cargo.

Similarly, the frame shown in FIGS. 13 and 14 use a number of cross beams spaced along the length of the frame rather than the two or four cross beams 26,28 used in the previous embodiments. The cross beams 26 of the present embodiment may be generally planar rather than the elongate beams of the former embodiments and may extend downwardly from the top of the frame. These cross beams taper generally laterally outwardly from the central beam so that they are higher in the center than they are toward the ends. In order to avoid interfering with the recesses defined by the arms 30 for receiving the bladders, the central portions of the cross braces positioned through these recesses may be profiled to further define the recess.

If so desired, the cross braces 27 positioned at the ends of the frame may extend generally parallel to rather than longitudinally of the central beam 20. These cross braces 37 may be attached to the arms 30 at the ends of the frame rather than the central beam. They also desirably taper toward their outer ends, for reasons explained immediately below.

As in the embodiment of FIG. 10, the frame 10 of FIGS. 13 and 14 uses a cover 60, as mentioned above. This cover may be a flexible, detachable tarpaulin as in the previous embodiment, but is preferably a relatively rigid and permanent part of the frame. The cross braces 26,27 serve as a structural "skeleton" supporting the cover 60. The cross braces taper toward their outer ends to define a cover having a sloped profile with an elongate apex coinciding substantially with the central beam 20. This reduces the wind profile of the cover, making the cover more fuel efficient and less likely to make the railcar susceptible to wind currents than if the cover had a blunt, rectangular profile.

As noted above, a frame of the invention is provided with means permitting a crane or other lifting mechanism to lower the frame onto a railcar or to lift a frame from a railcar. The upstanding grappling members 70 shown in the various drawings are best seen in FIGS. 16A and B. FIG. 16A shows a first embodiment of the grappling member 70 assembled as part of the central beam 20 of the invention. As noted above, in one preferred embodiment the central beam comprises a pair of C-shaped brackets 22, with each C-shaped bracket being open in a direction facing away from the other C-shaped bracket.

In such an embodiment, the grappling member may advantageously comprise an elongate base 72 and an upstanding segment 74, with the base being sized for deployment between the C-shaped brackets 22 of the central beam. This base may be attached to the central beam 20 in any desired fashion, such as by welding or by means of bolts or the like passing through the ports 73 in the base and in the brackets 22 of the central beam. As is the case with the bladder connectors 40 described above, this connection of the grappling members 70 to the central beam will also serve to rigidly connect the C-shaped brackets 22 of the beam to one another.

The upstanding segment 74 of the grappling member 70 is designed to be readily grasped by a crane or the like for raising or lowering the frame. The upstanding segment 74 may be a simple eyelet adapted to receive a standard hook of a crane, as illustrated in FIGS. 13 and 14. In a preferred embodiment, though, the upstanding segment comprises a laterally extending rod 76 and a plate 77 which are carried above the base of the grappling member and are therefore positioned generally above the top of the central beam 20. It is contemplated that the top of the plate 77 and the top of the rod 76 will be generally aligned with one another to position the lower part of the rod below the bottom of the plate. Since the rod will therefore extend below the plate, the rod and plate together define a recess 75 (best seen in FIGS. 18A-C) for receiving a grapple of a crane, as described below.

Although a frame of the invention may use a single grappling member 70 positioned approximately midway along the length of the central member, it is preferred that more than one grappling member be used. As shown in the drawings, the frame may be provided with a pair of grappling members spaced away from one another along the length of the central beam. These grappling members should be spaced approximately the same distance from the middle of the central beam, as shown in FIGS. 1-14, so that the weight of the frame and any attached bladders is substantially equally distributed between the two grappling members.

Spacing two or more grappling members apart from one another rather than using a single, centrally located grappling member will improve the torsional stability, i.e. the resistance to turning and twisting, of the frame when it is lifted off of or lowered onto a railcar. Not only does this make the loading and unloading operation more predictable, it will help ensure that the frame is properly aligned with a railcar when it is to be deployed on the car.

Figure 11:
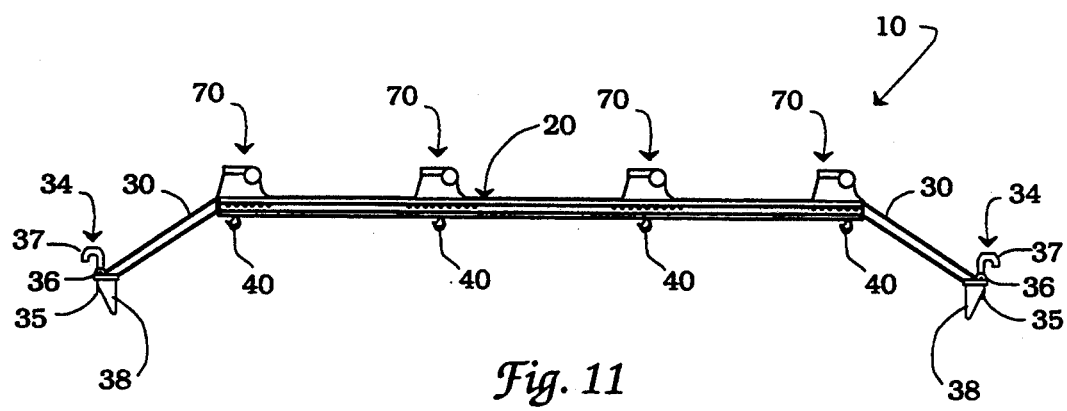
FIG. 11 is a side view of a frame according to another embodiment of the present invention.
Figure 12:
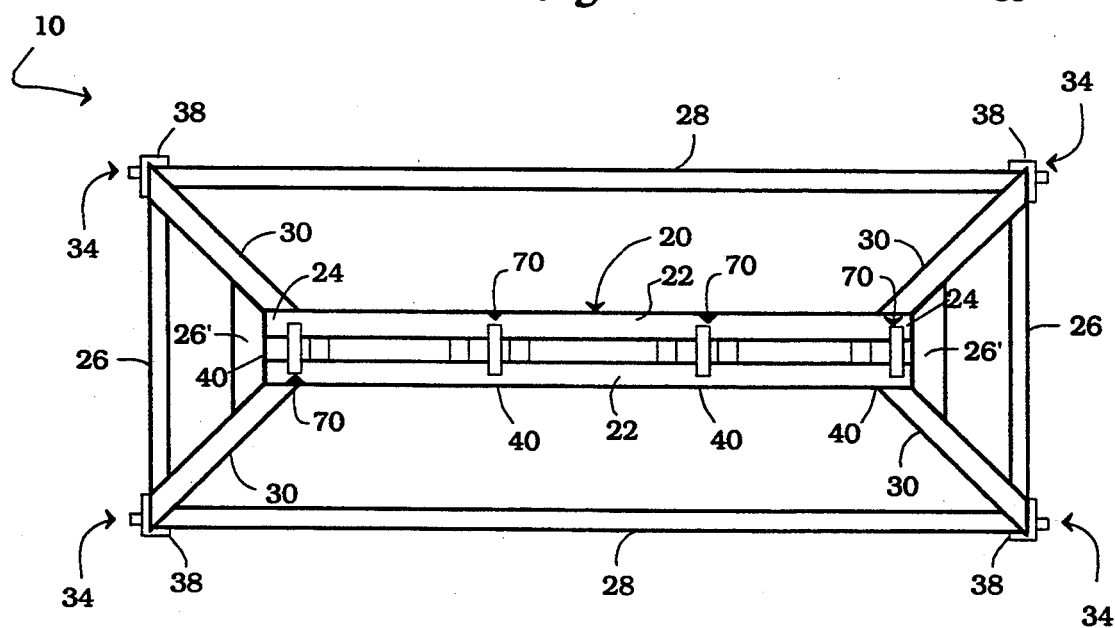
FIG. 12 is a top view of the frame of FIG. 11.

FIGS. 11 and 12 depict another slightly modified version of a frame 10 of the invention. This frame is substantially the same as the frame shown in FIGS. 8 and 9, but this frame includes four, rather than two, grappling members 70. In this embodiment, the bladder connector 40 and the grappling member are formed as a single element, with the hook (42 in FIG. 15) extending below the central beam 20 and the upstanding segment of the grappling member 70 extending above the top of the beam. A similar construction is also utilized in the embodiment of FIGS. 13 and 14, although the exact structure and spacing of the grappling members differ somewhat from the construction shown in FIGS. 11 and 12.

Figure 17:
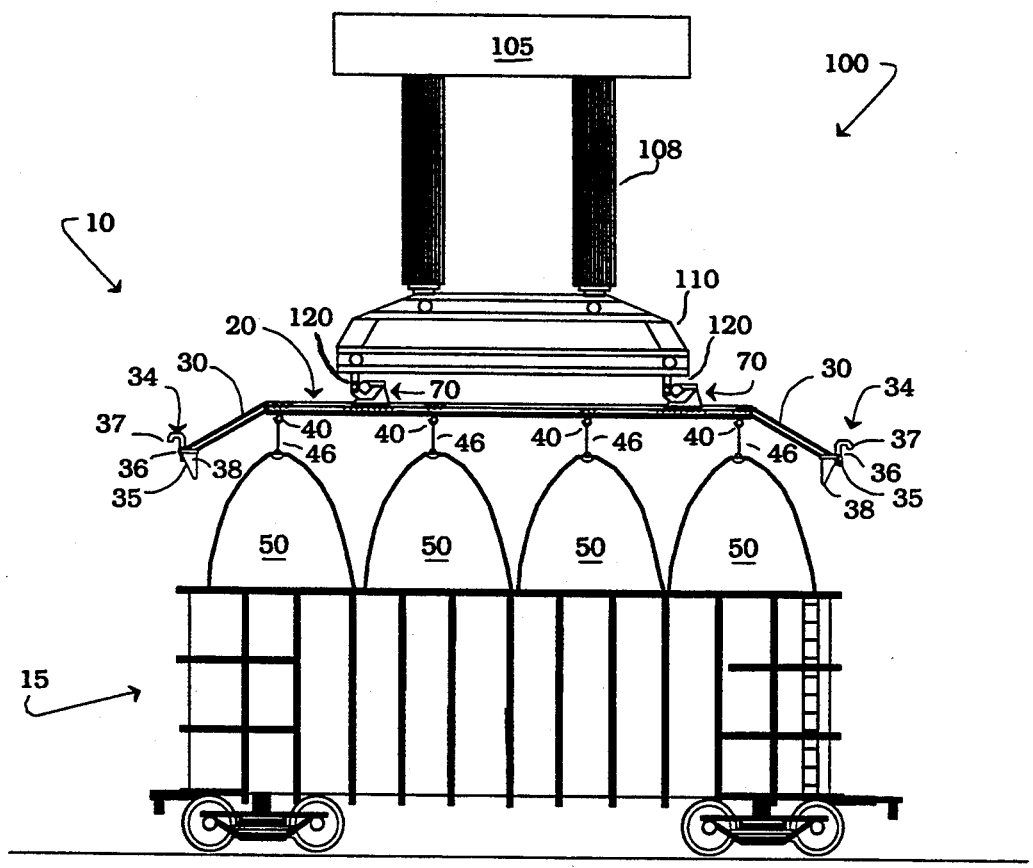
FIG. 17 is a schematic depiction of an overhead crane mechanism used to raise or lower a frame of the invention.

In one preferred embodiment, the frames are lowered onto or lifted off of a railcar by means of an overhead crane mechanism, as depicted schematically in FIG. 17. Such overhead cranes generally comprise a crane 100 suspended above a length of a railroad track and the crane is movable laterally along an overhead beam 105 from a position immediately above the track to a position above an area adjacent the track. The crane may lift cargo or the like from a railcar and move the cargo laterally away from the track before lowering it for stacking next to the track. Such overhead cranes are widely used in the railroad industry and need not be discussed in great detail here.

When such an overhead crane mechanism is used in connection with the present invention, it is desirably provided with grapples adapted to securely grasp the grappling members 70 of the frame 10. The crane 100 should be provided with the same number of grapples 120 as grappling members are provided on the frame and the grapples should be spaced apart from one another the same distance as the grappling members are spaced along the central beam 20. As shown in FIG. 17, the crane 100 desirably includes a relatively rigid body 110 to which the grapples 120 are attached. This body will maintain the relative positions of the grapples as the crane is lowered and raised, making attachment of the crane to the frame easier and more predictable. The body may be connected to the overhead beam in any manner which would permit ready vertical movement of the crane, body, such as by means of hydraulic lifts or a series of cables 108. Obviously, the lifting mechanism should be adequate to handle the anticipated weight of the frame and a plurality of filled bladders attached to the frame.

The grapples 120 may take any suitable shape, such as a hook shape. A preferred embodiment of a grapple 120 of the crane 100 adapted for use with the grappling members 70 described above is shown schematically in FIGS. 18 A-C, though. The grapple 120 may be pivotally attached to the body of the crane by means of a pin 122 or the like to permit the grapple to turn with respect to the relatively rigid body. In a preferred embodiment, the grapple is bifurcate and includes a pair of generally horizontally oriented fingers 124 (only one of which is visible in the view of FIGS. 18A-C). The fingers should be spaced apart from one another so they may straddle the extension 78 of the upstanding portion of the grappling means 70. Each of the fingers may then engage a portion of the laterally extending rod 76 and the forward end of the fingers may fit within the recess 75 described above and abut against the bottom of the plate 77.

Figure 18A:
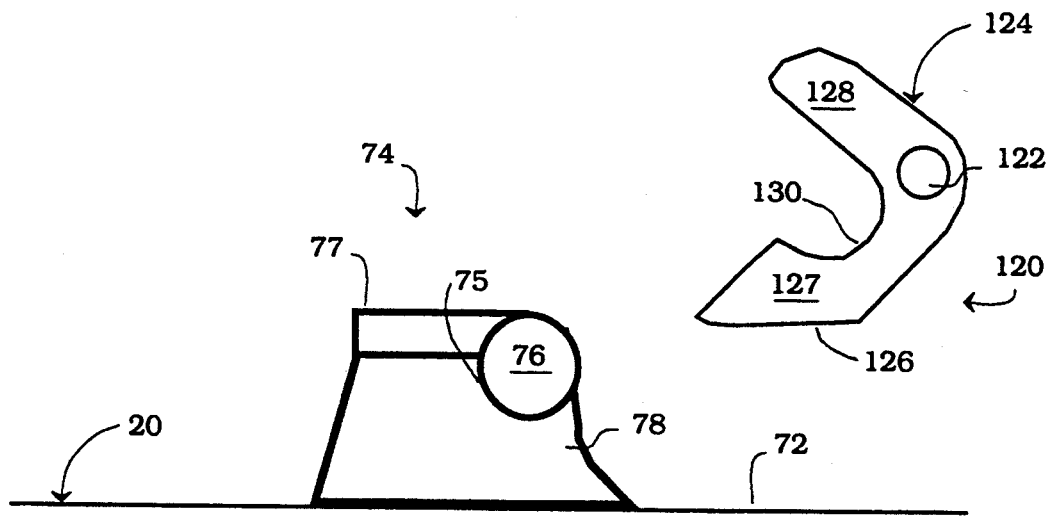
FIGS. 18A-C schematically and sequentially depict a grapple of a crane mechanism engaging a grappling member of a frame of the invention.
Figure 18B:
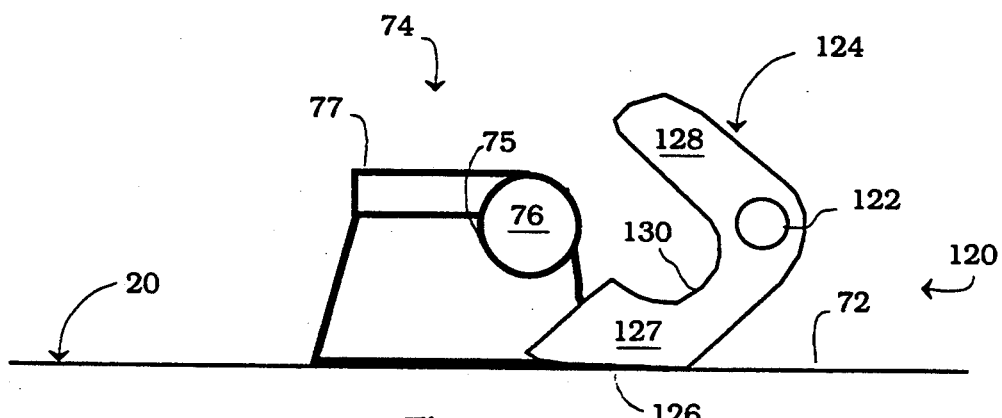
Figure 18C:
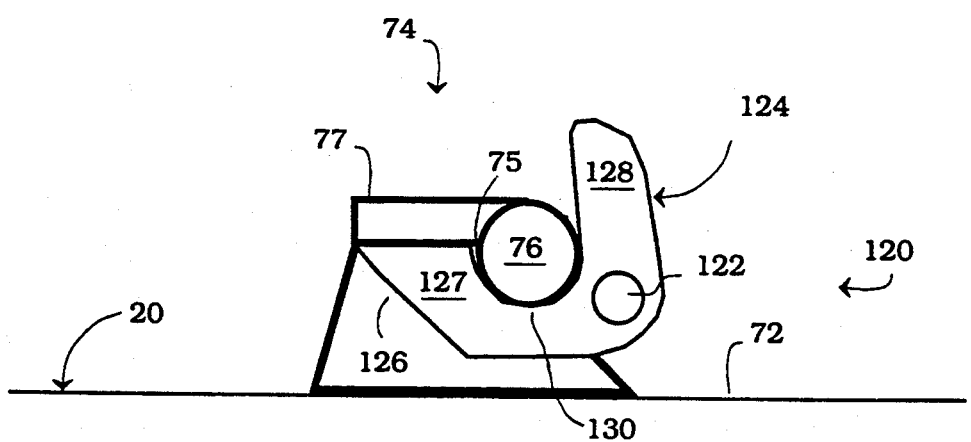

FIGS. 18A-C schematically depict the manner in which the grapples 120 are intended to engage the grappling members 70 during use. As shown in FIG. 18A, the generally J-shaped grapple 120 will initially be positioned generally above and in front of (i.e. to the right in FIGS. 18) the grappling members of the frame. As the rail car progresses, the grapple is lowered until the bottom edge 126 of each finger engages and rests upon the central beam 20 of the frame, as shown in FIG. 18B. The bottom edge 126 is desirably generally flat so that by resting on the beam 20 it will reproducibly position the grapple with respect to the grappling member 70 of each frame.

As the train progresses further down the track, the grapple will slide along the central beam 20 and the forward leg of the fingers 124 will slide beneath the rod 76 of the grappling member. The rod will then abut against the rearward legs 128 of the fingers 124. The fingers should be shaped so that the engagement between the rod 76 and the rearward legs 128 will be disposed above the axis of the pivot pin 122 attaching the grapple to the body of the crane. As the train continues its movement relative to the crane, the abutment between the rod and the rearward legs will urge the fingers 124 to pivot about the pivot pin 122.

As depicted in FIG. 18C, the grapple will continue to pivot until the forward legs 127 of the fingers swing upwardly into engagement with the bottom of the plate 77 of the grappling member. The fingers are provided with a cradle 130 sized ad shaped to receive a portion of the rod 76 of the grappling means. The cradle 130 and forward leg 127 should be shaped to permit the leg to pivot generally into the recess 75 behind the rod. The crane body may then be lifted generally vertically upwardly to remove the frame and any bladders depending therefrom from the railcar to which it is attached. When the frame is to be placed on a railcar the process described above and illustrated in FIGS. 18A-C may essentially be reversed by lowering the crane body to permit the grapple to pivot out of engagement with the rod, sliding the grapple rearwardly along the central beam and lifting the grapple away from the deployed frame.

While a preferred embodiment of the present invention has been described above, it is to be understood that various changes, variations and adaptations may be made in the invention without departing from the spirit of the invention or the scope of the appended claims.

We claim:

1. A railroad car conversion apparatus for hauling a flowable material in an open-topped railroad car comprising:
   a. an elongate central beam having first and second ends and a plurality of bladder connection means for releasably attaching a plurality of material-receiving bladders to the central beam;
   b. a plurality of arms extending generally laterally outwardly from the central beam, the arms and central beam being sized to permit each of the arms to abut an upper edge of the railroad car;
   c. locking means carried by the arms for releasably attaching the arms and the central beam to the railroad car; and
   d. grappling means carried by of the central beam and being adapted to be engaged by a crane mechanism for lifting the central beam and any bladders attached thereto generally upwardly away from the railroad car.

2. The conversion apparatus of claim 1 wherein a plurality of said arms are attached to the central beam adjacent each of the bladder connection means, the arms defining a recess.

3. The conversion apparatus of claim 2 wherein the recess is sized to receive one of said bladders when the bladder is empty and collapsed.

4. The conversion apparatus of claim 1 further comprising a cover means carried by the frame, the cover being adapted to substantially cover a material within an interior of the open-topped railroad car.

5. The conversion apparatus of claim 1 wherein the central beam comprises a pair of elongate, generally C-shaped brackets, the brackets being oriented substantially parallel to one another and extending along the entire length of the central beam.

6. The conversion apparatus of claim 1 wherein the central beam comprises a plurality of segments movable with respect to one another to adjust the length of the central beam.

7. The conversion apparatus of claim 6 wherein the central beam comprises a plurality of elongate I-beam segments and a plurality of C-shaped brackets, the I-beam segments being adjustables connected to one another by said C-shaped brackets.

8. A railroad car conversion apparatus for hauling a flowable material in an open-topped railroad car having a floor and a plurality of sidewalls extending upwardly from the floor, comprising an elongate central beam having first and second ends and a plurality of segments movable with respect to one another to adjust the length of the central beam, and at least one bladder connection means for releasably attaching at least one material-receiving bladder to the central beam; and a plurality of arms extending outwardly from the central beam, the arms and the central beam being sized to permit each of the arms to abut an upper edge of one of the sidewalls of the railroad car.

9. The invention of claim 8 wherein the central beam comprises at least two segments connected to one another by means of at least one pair of generally C-shaped brackets, the distance between adjacent ends of the segments being adjustable to permit the conversion apparatus to be used with a plurality of differently sized open-topped railroad cars.

10. The invention of claim 9 wherein the segments of the central beam comprise elongate lengths of I-beam.

11. A railroad car conversion apparatus for hauling a flowable material in an open-topped railroad car having a floor and a plurality of sidewalls extending upwardly from the floor, comprising:
an elongate central beam having first and second ends and at least one bladder connection means for releasably attaching at least one material-receiving bladder to the central beam;
a plurality of arms extending outwardly from the central beam, the arm and the central beam being sized to permit each of the arms to abut an upper edge of one of the sidewalls of the railcar; and
locking means carded by the arms for releasably attaching the arms to the railroad car, the locking means comprising a clamp means pivotably attached to one of said arms adjacent its length, the clamp means being pivotable between a locking position wherein it engages a sidewall and an unlocked position wherein it disengages from the sidewall.

12. A railroad car conversion apparatus for hauling a flowable material in an open-topped railroad car having a floor and a plurality of sidewalls extending upwardly from the floor, comprising:
an elongate central beam having first and second ends and at least one bladder connection means releasably attaching at least one material-receiving bladder to the central beam;
a plurality of arms extending outwardly from the central beam, the arms and the central beam being sized to permit each of the arms to abut an upper edge of one of the sidewalls of the railroad car; and
wedge means for properly positioning the arms and the central beam with respect to the sidewalls when the arms are brought into engagement with the sidewalls.

13. The invention of claim 12 further comprising locking means carried by the arms for releasably attaching the arms to the railroad car, the locking means comprising a clamp means for engaging one of said sidewalls of the railroad car and said wedge means.

14. A railroad car conversion apparatus for hauling a flowable material in an open-topped railroad car having a floor and a plurality of sidewalls extending upwardly from the floor, comprising:
an elongate central beam having first and second ends and at least one bladder connection means for releasably attaching at least one material-receiving bladder to the central beam;
a plurality of arms extending outwardly from the central beam, the arms and the central beam being sized to permit each of the arms to abut an upper edge of one of the sidewalls of the railroad car; and
at least one elongate cross-beam, the cross-beam being attached at each of its ends to a different arm.

15. A railroad car conversion apparatus for hauling a flowable material in an open-topped railroad car having a floor and a plurality of sidewalls extending upwardly from the floor, comprising:
an elongate central beam having first and second ends and at least one bladder connection means for releasably attaching at least one material-receiving bladder to the central beam;
a plurality of arms extending outwardly from the central beam, the arms in the central beam being sized to permit each of the arms to abut an upper edge of one of the sidewalls of the railroad car; and
at least one cross-member connected to two of said arms, the cross-member being formed of a relatively rigid plate material.

16. A railroad car conversion apparatus for hauling a flowable material in an open-topped railroad car having a floor and a plurality of sidewalls extending upwardly from the floor, comprising an elongate central beam having first and second ends and at least one bladder connection means for releasably attaching at least one material-receiving bladder to the central beam; and a plurality of arms extending outwardly from the central beam, the arms and the central beam being sized to permit each of the arms to abut an upper edge of one of the sidewalls of the railroad car; wherein the central beam and the arms define a frame in which the arms extend generally laterally and downwardly from the frame, and further comprising cover means carried by the frame for substantially covering the top of the railcar with a reduced wind profile.

17. A railroad car conversion apparatus for hauling a flowable material in an open-topped railroad car having a floor and a plurality of sidewalls extending upwardly from the floor, comprising:

an elongate central beam having first and second ends and at least one bladder connection means for releasably attaching at least one material-receiving bladder to the central beam;

a plurality of arms extending outwardly from the central beam, the arms and the central beam being sized to permit each of the arms to abut an upper edge of one of the sidewalls of the railroad car; and grappling means carried by the central beam and being adapted to be engaged by a crane mechanism for lifting the central beam and any bladders attached thereto upwardly away from the railcar.

18. The invention of claim 17 wherein the grappling means extends above the central beam and includes a laterally extending rod and a plate, the rod and the plate together defining a recess for receiving a portion of a grapple of the crane mechanism.

19. The invention of claim 17 wherein the grappling means comprises a plurality of grappling members, the grappling members being spaced along the length of the central beam.

20. The invention of claim 17 wherein the grappling means are adapted to align the frame with the crane mechanism.

* * * * *